United States Patent

[11] 3,627,154

| [72] | Inventor | Ralph E. Troup<br>4240 N.E. 24th Ave., Lighthouse Point, Fla. 33065 |
|---|---|---|
| [21] | Appl. No. | 42,991 |
| [22] | Filed | June 3, 1970 |
| [45] | Patented | Dec. 14, 1971 |

[54] TRAILERABLE TOWING DEVICE AND JACK FOR VEHICLES
6 Claims, 15 Drawing Figs.

[52] U.S. Cl. .................................................. 214/86 A, 280/402
[51] Int. Cl. ...................................................... B60p 3/12
[50] Field of Search ......................................... 214/86 A; 280/402

[56] References Cited
UNITED STATES PATENTS

| 3,152,704 | 10/1964 | Russell ........................ | 214/86 A |
| 3,458,068 | 7/1969 | Scott ............................ | 214/86 A |
| 3,510,016 | 5/1970 | Wolff et al. ................... | 214/86 A |

*Primary Examiner*—Albert J. Makay
*Attorney*—Dominik, Knechtel & Godula

ABSTRACT: A trailerable towing device and jack for vehicles having a single source of lifting effort applied to an equalizer bar which is guided along parallel guide rails inclined upwardly and forwardly. The equalizer bar terminates in two flexible belts having chains at the end portion thereof for engaging the undercarriage of a vehicle, usually an automobile which has been disabled and is to be towed. A lower frame rides atop a pair of castered rear wheels with a retractable wheel at the front portion and a draw bar with a standard trailer hitch attachment. The guide rails are demountably secured to the lower frame by means of a demountable brace. The entire assembly, by removing several bolts may be knocked down for shipment in a flat configuration or similarly knocked down for storage.

Patented Dec. 14, 1971  3,627,154

INVENTOR
Ralph E. Troup

BY Dominik, Knechtel & Godula
ATTYS.

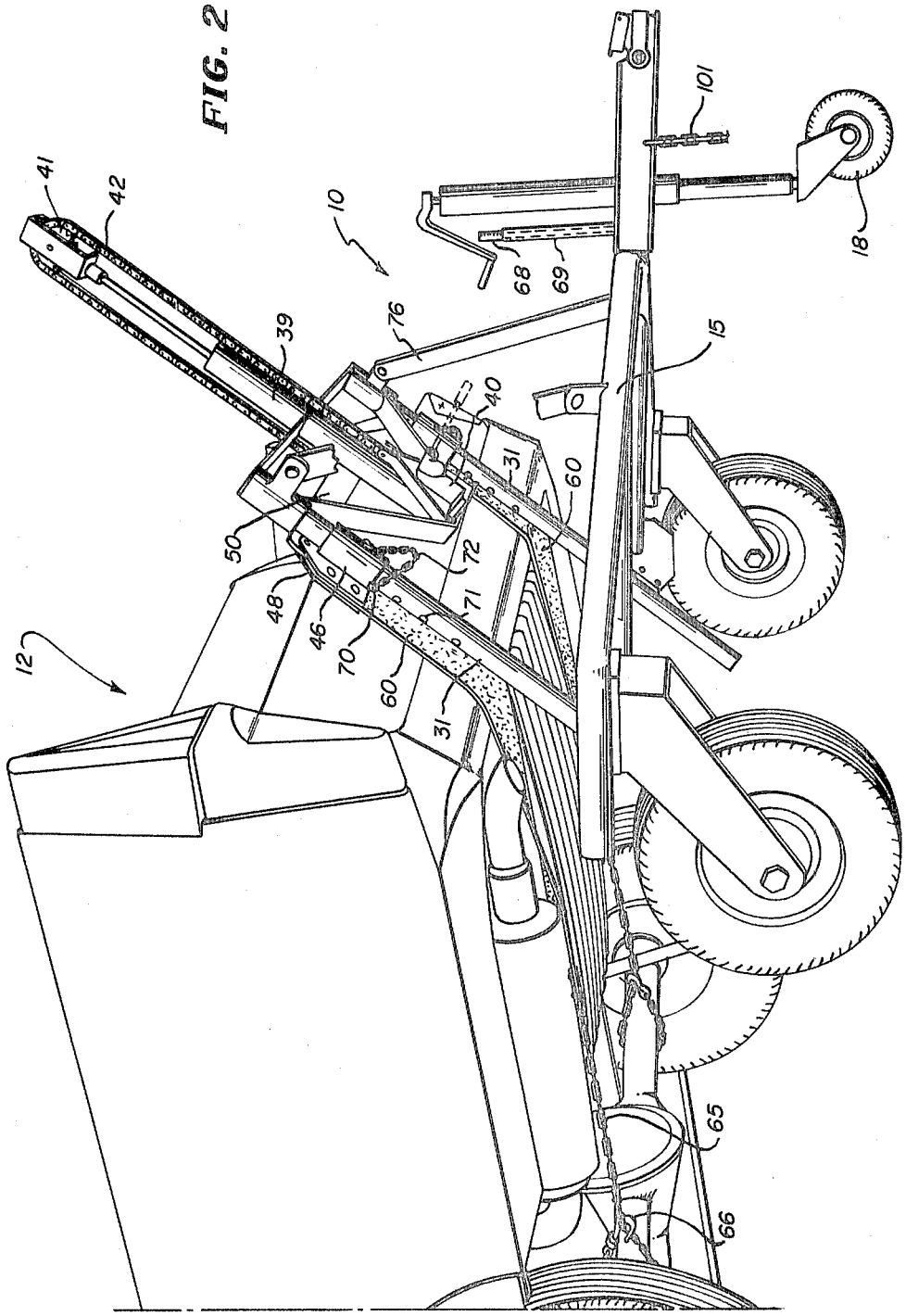

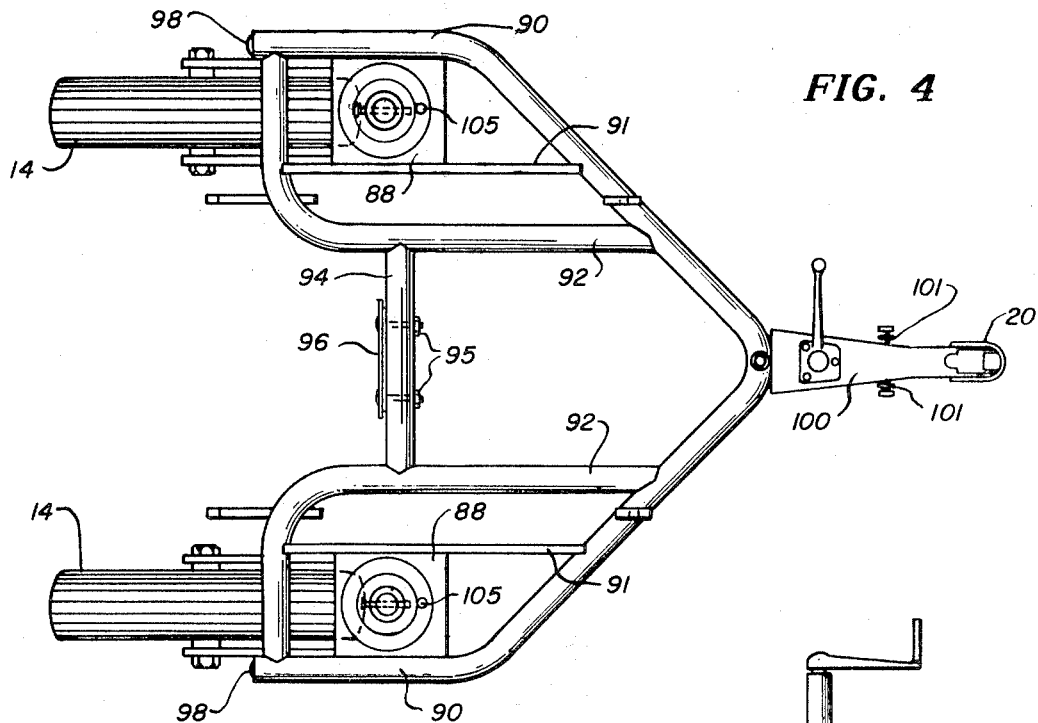
FIG. 4
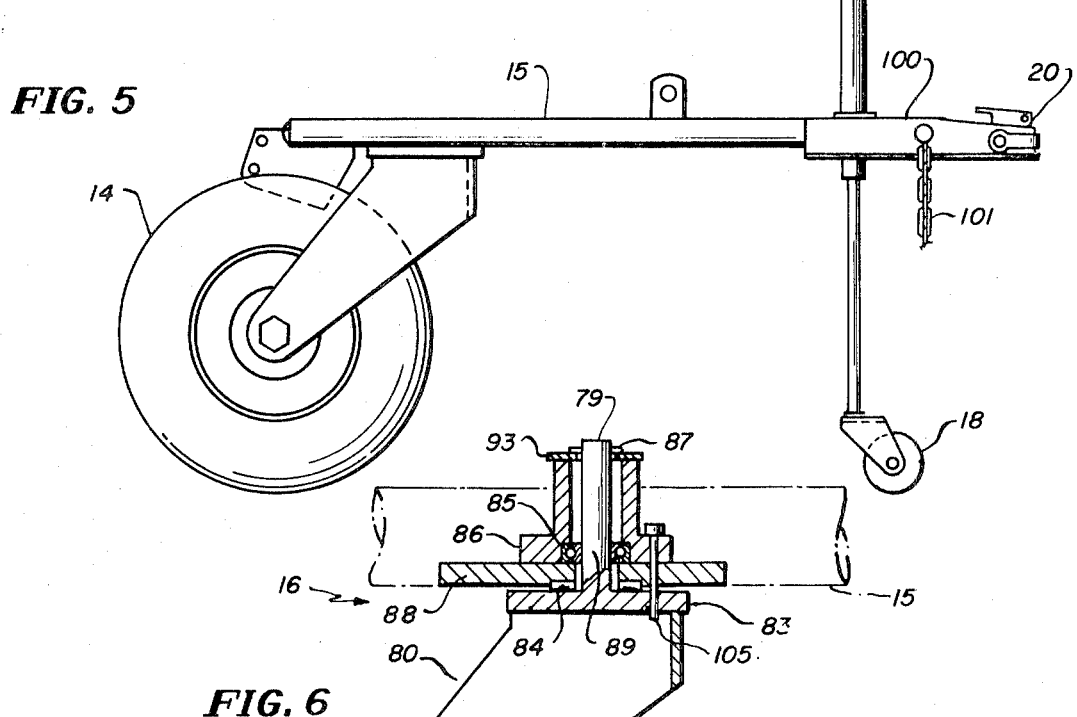
FIG. 5
FIG. 6
INVENTOR
Ralph E. Troup
BY Dominik, Knechtel & Godula
ATTYS.

Patented Dec. 14, 1971
3,627,154
4 Sheets-Sheet 4
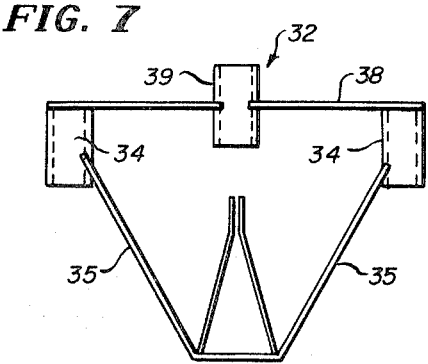
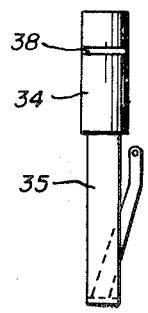
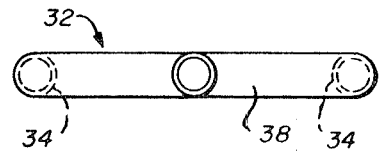
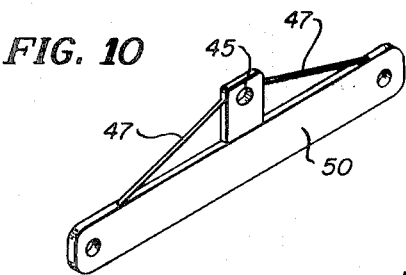
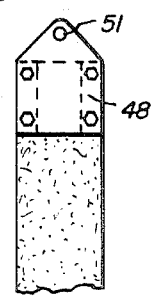
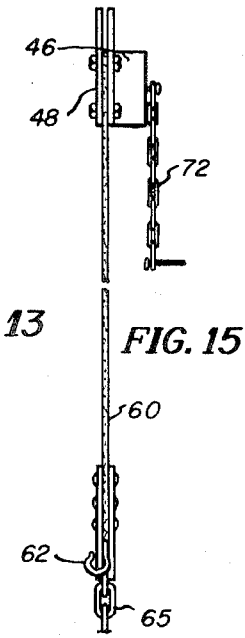
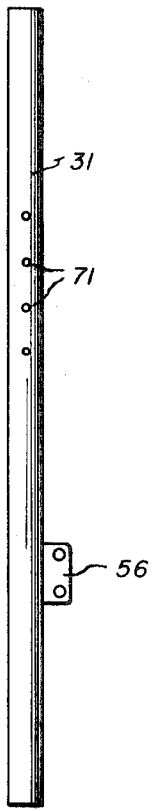
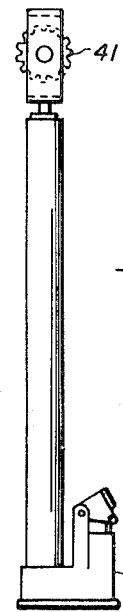
INVENTOR
Ralph E. Troup
BY Dominik, Knechtel & Godula
ATTYS.

TRAILERABLE TOWING DEVICE AND JACK FOR VEHICLES

The present invention relates to a trailerable towing device and jack for vehicles and finds particular utility as a trailerable wrecker attachment to a towing vehicle such as a pickup truck, or ordinary automobile having a trailer hitch.

1. Background of Invention

As indicated above, the invention relates to trailed accessories for vehicles such as automobiles, pickup trucks, and the like having a trailer hitch. The towing device is actuated preferably by a single jack which elevates an equalizer bar on a pair of parallel guide rail slides which, in turn, have flexible belt extensions which gently engage the bumper of the towed vehicle, the primary attachment being made by a pair of chains at the end of the flexible belt.

2. Description of the Prior Art

Trailed vehicles to be used as towing devices are exemplified by U.S. Pat. No. 3,152,704. A unit such as exemplified in U.S. Pat. No. 3,152,704, for best operation, must be exactly centered on the vehicle being towed, or the lifting members or carriage may be jammed against the guides. Additionally, with the wide variety of shapes of vehicle bumpers, including plastic, inflatable, and other bumpers, a high degree of flexibility of engagement is required over that shown in U.S. Pat. No. 3,152,704.

Flexible belts for engaging vehicles in a towing arrangement are disclosed in U.S. Pat. No. 2,913,131. The device that is shown in this patent, however, suffers from the disadvantage of being relatively inflexible in use since the span between the flexible belts is rigidly fixed by a tow bar.

SUMMARY OF INVENTION

In view of the prior art as indicated above, as well as the necessity to keep pace with the varying load requirements of a trailed towing vehicle, it is a principal object of the present invention to provide a trailerable towing device and jack for vehicles in which an equalizer bar is employed to readily adjust for offset loads. A related and important object of the invention is to provide a towing device which is demountable for reduced cost in shipping, and which, when stored out of use, takes up a minimum of space.

A further object of the present invention is to provide a towing device which has safety features including remote operation of the lifting element, stop pins for securing the elevated towed vehicle in the event of the failure of the lifting element, and smooth lifting action which minimizes the stresses on the towed vehicle as well as the towing device.

A further object of the invention is to provide a towing device in which attachment to a wide variety of vehicles is readily achieved by means of a flexible belt and chain-hook combination.

The foregoing objectives are achieved in a trailerable towing device and jack for vehicles which has a lower frame, the outboard portions of which are secured to casters and their associated running wheels. A third wheel which is retractable is provided at the forward portion along with a drawbar for attachment to a standard trailer hitch. A pair of guide rails are demountably secured to the rear portion of the lower frame and at their upper portions engage the jack frame. Jack frame braces complete the triangular assembly which supports the jack and its associated lifting element, the latter of which is attached to an equalizer drawbar. A pair of flexible belts are secured to the guide rail slides at one end of the belts, and at the other end hookup end plates are provided which secure a chain and hook structure for engaging the undercarriage of the towed vehicle. Through holes are provided in the guide rails to engage transverse pins which positively secure the guide rail slides in a preselected position after the towed vehicle has been raised.

Further objects and advantages of the present invention will become apparent as the following description of an illustrative embodiment proceeds, taken in conjunction with the drawings, in which:

FIG. 2 is a perspective partially broken view from the underneath portion of the towed vehicle indicating the engagement of the towed vehicle by the towing device.

FIG. 4 is a plan view of the lower frame illustrating the geometrical relationships between the lower frame, the castered wheels, and the position of the lifting structure.

FIG. 5 is a side view of the lower frame of FIG. 4.

FIG. 6 is a partially sectional side view of the caster assembly.

FIG. 7 is a plan view of the jack frame and assembly.

FIG. 8 is a side view of the jack frame assembly of FIG. 7.

FIG. 9 is a top view showing the jack frame assembly of FIG. 7.

FIG. 10 is a perspective view of the equalizer bar.

FIG. 11 illustrates a guide rail from the demountable frame.

FIG. 12 illustrates the relationship between the jack sprocket and the jack mechanism.

FIG. 13 illustrates a lifting strap, showing the lifting hook fixed to the lifting strap hookup end.

FIG. 14 is a top view of the lifting strap of FIG. 13 showing attached thereto the guide rail slide.

FIG. 15 is a side view of the lifting strap of FIG. 13.

Figure 1:
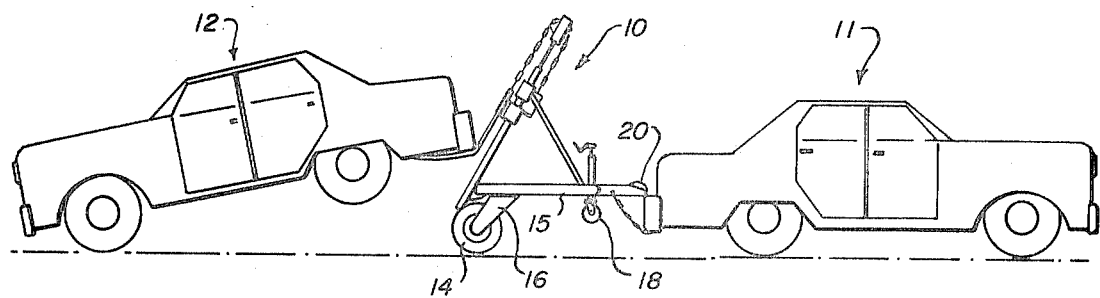
FIG. 1 is a side elevation illustrating the relationship between the towing vehicle and the towed vehicle when the trailerable towing device and jack illustrative of the present invention is in use.

Referring now to FIG. 1, it will be seen that the towing device 10 serves to bridge the gap between a towing vehicle 11 and a towed vehicle 12. The towing device 10 rides atop a pair of laterally spaced wheels 14 which are secured to the lower frame 15 by means of casters 16. A retractable wheel 18 is at the forward portion of the lower frame 15, directly in front of which is located a trailer hitch 20.

Figure 3:
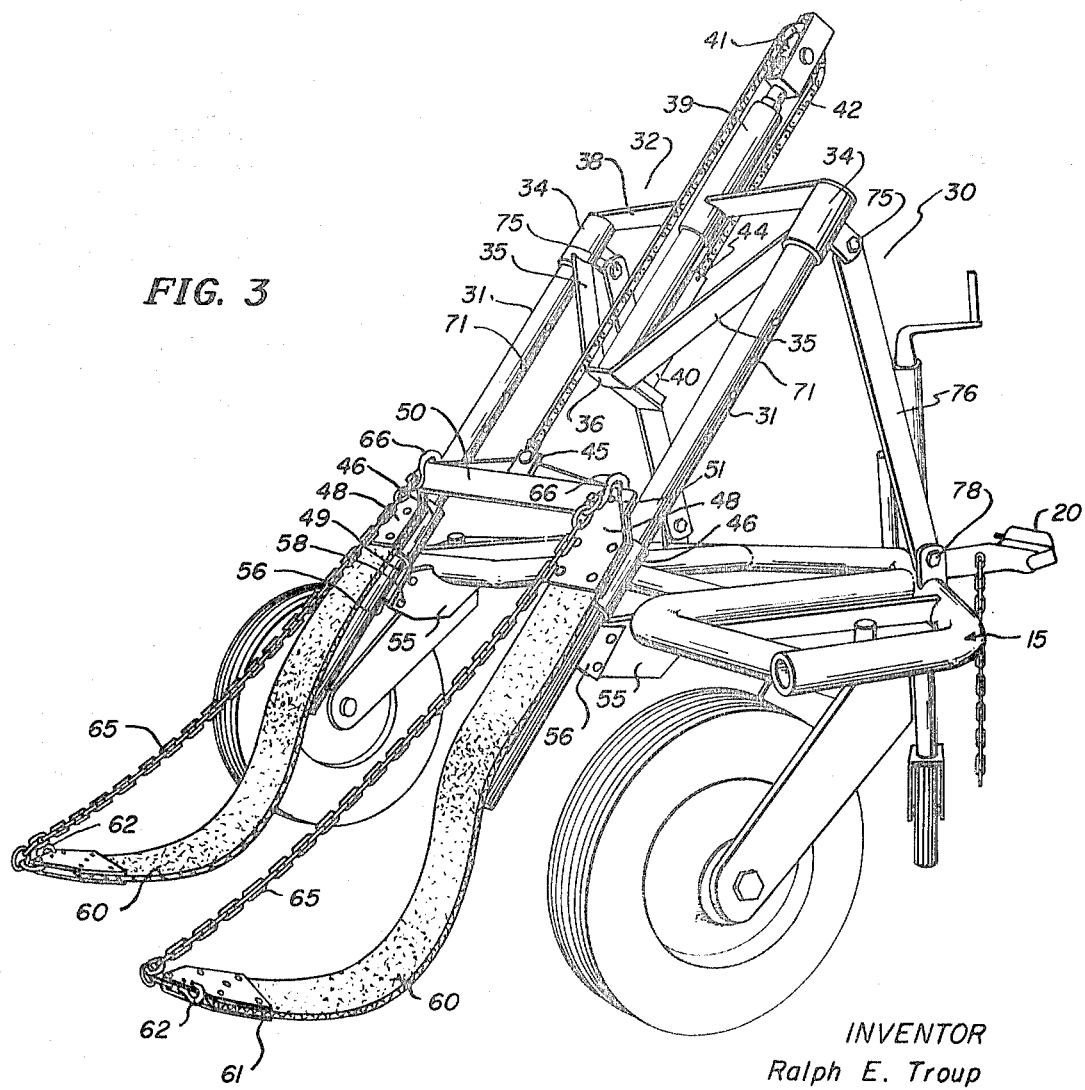
FIG. 3 is an enlarged perspective view from a rear corner of the illustrative towing device showing its main assemblies as well as the relationship between the equalizer drawbar and the lifting element.

Referring now to FIG. 3, it will be seen that the lower frame 15 has fixed thereatop a demountable frame 30. The demountable frame 30 is triangular or A shaped in configuration, the rear members of which are guide rails 31. Atop the guide rails 31 is a jack frame assembly 32 having short end tubes 34 proportioned to nestingly receive the guide rails 31 at their upper ends. A V-shaped base 35 at the lower portion of the jack frame 32 terminates in a central jack baseplate 36. A top crossbar 38 is secured at its ends to the end tube 34, and has a jack housing sleeve 39 at its central portion.

The jack 40 is positioned slidingly through the jack housing sleeve 39 of the jack frame 32, and mounted at its lower portion to the jack baseplate 36. At its upper end, the jack 40 is provided with a jack sprocket 41 and jack chain 42, here illustrated as the roller type. The jack chain dead end 44 is engaged in the jack 40 or alternatively jointly with the jack baseplate 36, and the chain is wound over the jack sprocket 41 and extends downwardly and is secured to the equalizer bar 50 by means of the jack chain anchor 45.

To accommodate varying loads, the equalizer bar 50 is pivotally secured by a pair of pins 51 at its ends to the guide rail slides 46. It will be seen that the guide rail slides 46 have a pair of strap mounting plates 48 at their upper portion which flankingly engage the ends of the equalizer bar 50 secured by means of the pivot pins 51. Further to be observed is the guide rail slide lower edge 49 which prevents the guide rail slides 46 from sliding off the guide rails 31, thereby creating an added safety feature by engaging the lower frame mounting plate 56 which is connected to the guide rails 31 by means of a pair of bolts 58.

The lifting straps 60 are secured at one end to the strap mounting plate 48 and are proportioned to have an overall length approximately that of the guide rails 31. Hookup ends 61 are provided at the remote portion of the lifting straps 60. Each hookup end 61 includes a fixed hook 62 and the associated vehicle chain 65. The vehicle chain 65, in turn, terminates with a pair of chain hooks 66 of the grab type. The chain hooks 66 can be used to engage the chain 65, or the chain 65 can be secured to the fixed hook 62 at the hookup end 61, or a combination thereof.

As shown now in FIG. 2, when the towing device 10 is brought up adjacent to the towed vehicle 12, the retractable wheel 18 is lowered to engage the ground. Thereafter the straps 60 are cradlingly wrapped underneath the rear bumper of the towed vehicle 12, and the chain 65 wrapped around the rear axle of such vehicle as shown, and the chain hooks 66 secured to the chain 65. Thereafter, the jack handle 68 is removed from the jack handle carrier 69 on the forward portion of the lower frame 15, and positioned into the jack 40 for operation.

The jack handle 68 is then reciprocated by the operator, standing to the rear of the towed vehicle 12, and as the jack 40 extends, and the jack sprocket 41 elevates, the jack chain 42 raises the equalizer bar 50 which tilts in one direction or the other to accommodate any offset in the weight of the towed vehicle 12 to one side or the other of the towing device 10. The straps curve to fit the underneath portion of the bumper of the towed vehicle 12, and the chains 65 securely engage the towed vehicle 12.

Once the fullest elevation has been achieved the retractable wheel 18 is lifted, and then the equalizer bar lockpins 70 are positioned within the next lower guide lockpin holes 71 on the guide rails 31, and the jack lowered slightly until the guide rail slide 46 abuts the equalizer bar locking pin 70. As will be seen, the equalizer bar locking pins 70 are secured to the guide rail slide 46 by means of a safety chain 72 to render them at all times available for usage.

As set forth in the objects of the invention above, it will be noted as shown in FIG. 7 and FIG. 3 that the jack frame 32 may be demounted by releasing the jack chain 42 from the jack chain anchor 45 on the equalizer bar 50, then removing the jack frame mounting bolt 75. The jack frame demountable brace 76 may then be swiveled downwardly against the lower frame 15, or removed by removing the demountable brace bolt 78 at the lower portion which secures the demountable brace 76 to the lower frame 15.

Similarly, as shown in FIG. 3 and FIG. 11, a pair of lower frame mounting bolts 58 secure the guide rail mounting fin 55 to the lower frame mounting plate 56 at the rear portion of the lower frame 15. Thus, the demountable frame 30 can be removed from atop the lower frame 15.

It will become apparent as a description of the caster 16 proceeds, that it, too, can be readily removed from the lower frame 15. The casters 16, as shown in FIG. 6, are made up of a caster body 80 having a pair of sideplates 81 and an axle mounting hole 82. A caster bearing assembly 84 fits atop the top plate 83, and serves to bridge the pair of sideplates 81. A caster shaft bearing 85 is located between the caster shaft 89 and the caster shaft mount 86, and adjacent to the caster plate 88. It should be noted that in the embodiment shown in FIG. 6, the caster 16 is secured to the lower frame 15 by means of a locking pin 87 which is inserted through the locking pinhole 79 in the caster shaft 89. A caster shaft locking washer 93 is located abuttingly between the locking pin 87 and the top of the caster shaft mount 86.

Referring now to FIG. 4, it will be seen that the caster plates 88 are provided inboard of the trailing portion of the lower frame outer member 90 which is a one-piece modified U-shaped bent tubular member. Caster plate trusses 91 are provided parallel with the longer leg of the lower frame inner member 92, and the caster plates 88 are secured between the caster plate trusses 91 and the outer ends of the lower frame outer member 90. Additionally a lower frame crossbar 94 is provided between the lower frame inner members 92, and serves not only to truss the lower frame 15, but also is provided with a pair of license plate bolts 95 to secure the license plate 96 in place. Reflectors 98 are provided at the rear portion of the lower frame outer member 90, thereby providing the safety facilities required for highway use.

As shown in FIG. 4 and FIG. 5 a trailer hitch 20 is provided at the forward portion of the lower frame drawbar 100. The lower frame drawbar 100 is conventionally secured to the forward portion of the lower frame outer member 90 and also houses the retractable wheel 18, as well as having a towing vehicle safety chain 101 secured thereto.

Caster travel lock pins 105 are provided to lockingly engage the casters 16 to prevent swiveling of the wheels 14 when raising or lowering the towed vehicle 12. Thus, it can be seen, that by setting the brakes on the towing vehicle 11 fore-and-aft movement of the towing device is prevented, and by use of the locking pins 105 the casters 16 are unable to swivel, therefore preventing any lateral movement of the towing device. Therefore, from the above, it will be noted that resulting stable configuration is achieved without the use of external devices such as wheel chocks. This stable configuration is achieved without the use of electrical, mechanical or hydraulic brakes for the wheels 14, although such braking systems may be optionally provided.

It will be further noted from FIG. 10 that the equalizer bar 50 is provided with a chain anchor 45 as previously discussed, but with an additional truss 47 to not only strengthen the equalizer bar body, but also securely position the chain anchor 45.

In review it will be seen that a towing vehicle 10 has been described with a demountable frame 30, as well as removable casters 16. The unit therefore can be readily knocked down for shipment or storage. In operation, an equalizer bar 50 is provided to accommodate lateral imbalance in the positioning of the towing vehicle 11 atop the lift strap 60. Additionally, safety features such as the inclusion of the lockpins 105 for the casters and the equalizer bar locking pin 70 for the elevating mechanism in the travel position and smooth operation of an hydraulic jack are contemplated.

While the invention has been described in connection with specific embodiments and applications, no intention to restrict the invention to the examples shown is contemplated, but rather to include within the invention all of the subject matter defined by the spirit as well as the letter of the annexed claims.

I claim:
1. A trailerable towing device and jack for vehicles comprising, in combination,
   a lower frame,
   a pair of running wheels mounted beneath the lower frame for ground engagement,
   a pair of parallel guide rails mounted to the lower frame and extending upwardly and forwardly,
   brace means securing said guide rails,
   a jack frame having means thereon for engaging the guide rails,
   a jack positioning centrally of the jack frame,
   an equalizer bar assembly means for slidingly engaging the parallel guide rails
   said equalizer bar having means for a pivotal engagement at its end portion with said guide rail engaging means,
   a pair of flexible straps secured to the equalizer bar assembly,
   chain means at the end portion of said flexible straps, and chain engaging means at the end portion of the chain whereby when the vehicle is engaged by securing the chain to an underportion thereof, the same may be raised by actuating the jack which, in turn, raises the equalizer bar and the straps to the end that the trailed vehicle is lifted when its end portion cradled by the straps and against the parallel guides.
2. In the towing device of claim 1 above, a demountable brace at the forward portion of the lower frame,
   said brace being secured to the lateral portions of the jack frame,
   said lateral portions of the jack frame proportioned for engaging the guide rails,
   said guide rails being demountable to the lower frame at a rear portion thereof whereby the entire unit may be disassembled by removing removable means at fixed locations.

3. In the towing device of claim 1, means defining a plurality of transverse holes in the guide rails, and pins for removable insertion into said hole means whereby the equalizer bar and strap assembly may be secured along elevated positions on said parallel guide rails and the jack means released from a holding function.

4. In the towing device of claim 1 above, a single jack at the central portion of the jack frame characterized by a sprocket at the extension portion thereof, a flexible tension member anchored at one end near the base portion of the jack, the other end of said flexible tension member wrapped around said sprocket and secured to the equalizer bar, whereby upon extending the jack the flexible tension member is forced to raise the equalizer bar by actuating of the jack.

5. In the towing device of claim 2, means defining a plurality of transverse holes in the guide rails, and pins for removable insertion into said hole means whereby the equalizer bar and strap assembly may be secured along elevated positions on said parallel guide rails and the jack means released from a holding function.

6. In the towing device of claim 2 above, a single jack at the central portion of the jack frame characterized by a sprocket at the extension portion thereof, a flexible tension member anchored at one end near the base portion of the jack, the other end of said flexible tension member wrapped around said sprocket and secured to the equalizer bar, whereby upon extending the jack the flexible tension member is forced to raise the equalizer bar by actuation of the jack.

* * * * *